Figure 1:
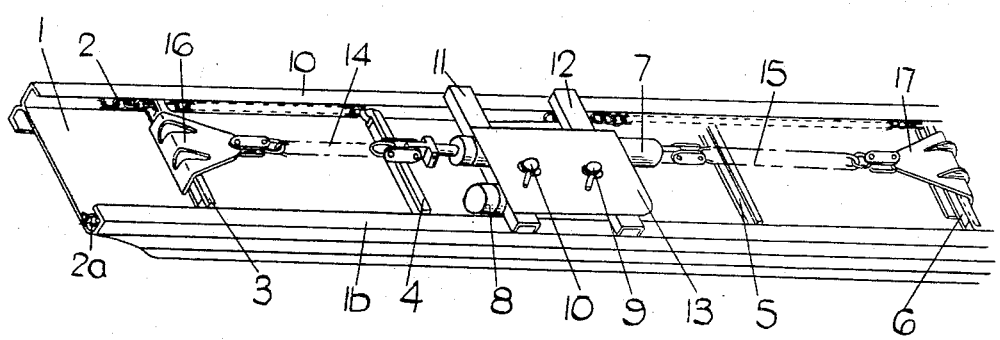

June 20, 1967          L. W. TAYLOR          3,326,524

HYDRAULIC SYSTEMS FOR CHAIN TIGHTENERS AND THE LIKE

Filed May 25, 1965          7 Sheets-Sheet 1

INVENTOR:

LAURENCE WILLIAM TAYLOR

By: nolte & nolte
ATTORNEYS

June 20, 1967     L. W. TAYLOR     3,326,524
HYDRAULIC SYSTEMS FOR CHAIN TIGHTENERS AND THE LIKE
Filed May 25, 1965     7 Sheets-Sheet 2
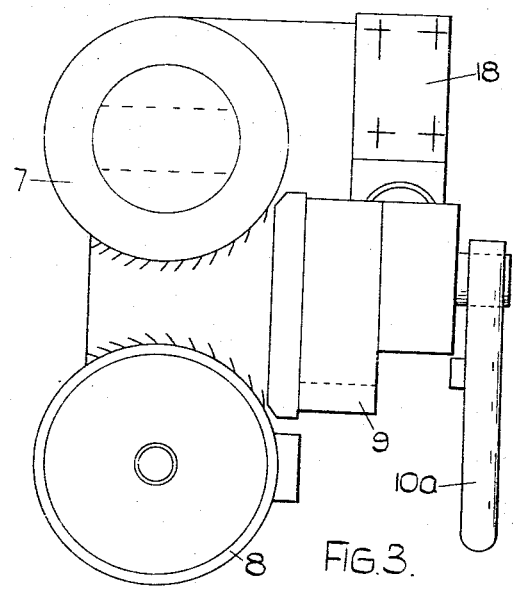
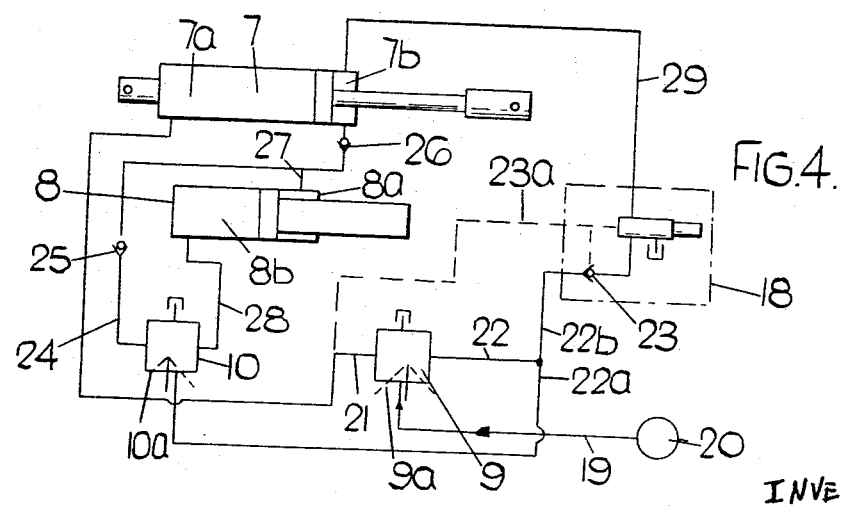
INVENTOR:
LAURENCE WILLIAM TAYLOR
By: Holt & Holt
ATTORNEYS

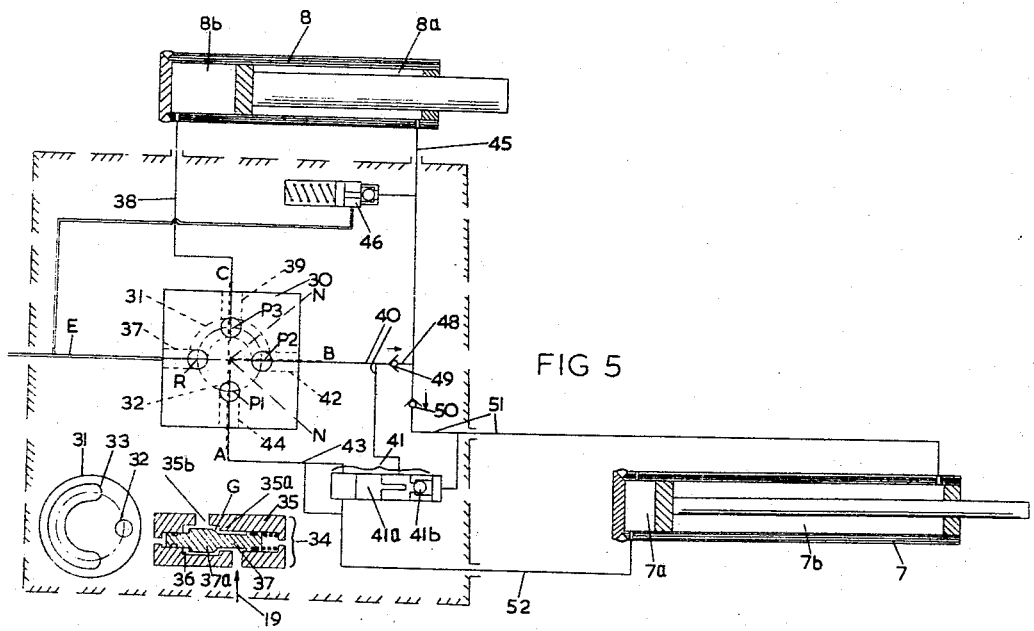
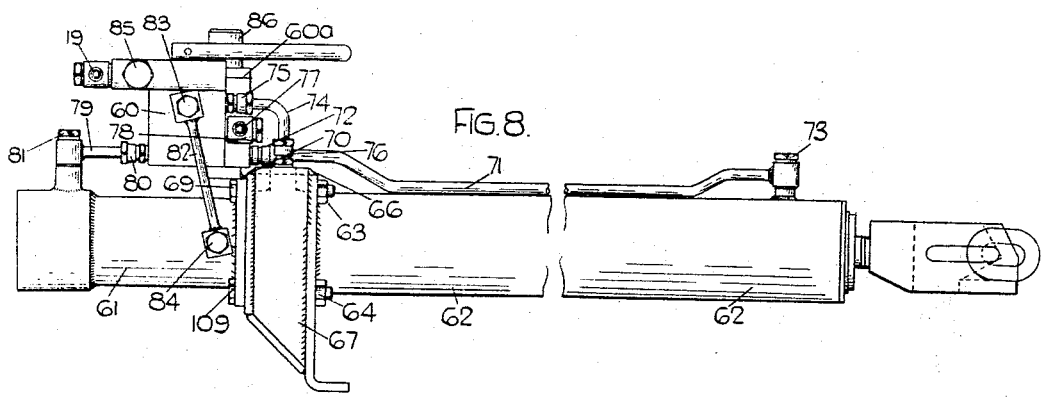

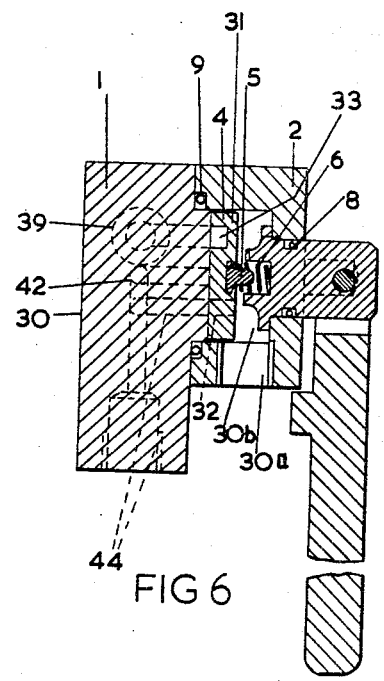
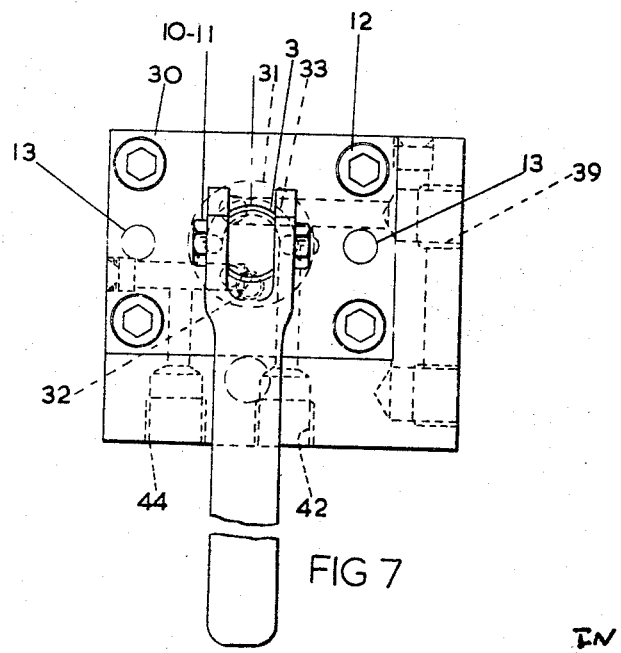

June 20, 1967   L. W. TAYLOR   3,326,524
HYDRAULIC SYSTEMS FOR CHAIN TIGHTENERS AND THE LIKE
Filed May 25, 1965   7 Sheets-Sheet 5

INVENTOR:
LAURENCE WILLIAM TAYLOR
By: Holt & Holt
ATTORNEYS

June 20, 1967  L. W. TAYLOR  3,326,524
HYDRAULIC SYSTEMS FOR CHAIN TIGHTENERS AND THE LIKE
Filed May 25, 1965  7 Sheets-Sheet 7

INVENTOR:
LAURENCE WILLIAM TAYLOR
By: Wolte & Wolte
ATTORNEYS

United States Patent Office 3,326,524
Patented June 20, 1967

3,326,524
HYDRAULIC SYSTEMS FOR CHAIN TIGHTENERS AND THE LIKE
Laurence William Taylor, Woodthorpe, Nottingham, England, assignor to W. E. & F. Dobson Limited, New Basford, England
Filed May 25, 1965, Ser. No. 458,587
Claims priority, application Great Britain, May 27, 1964, 21,834/64
5 Claims. (Cl. 254—51)

This invention is for improvements relating to conveyors of the panzer or scraper chain type such as are often employed in coal mines for the long wall method of extraction, the conveyor extending along the whole working face to deliver coal therefrom to a point of loading, and comprising a metal trough in which there runs opposite side chains which are interconnected at longitudinal spaced positions by flight bars.

There are occasions when there is a chain breakage due to overloading or other circumstances, and in attempting to repair the broken chain it becomes necessary to first close the broken ends of the chain together, and in view of the heavy load on the chain which in some instances is as much as 12 tons or more, the known mechanical or mechanical-hydraulic means using a hand pump are not completely satisfactory.

An object of the invention is to solve the problem by providing a tension applying device which minimizes the amount of manual labor required.

The invention provides a portable chain tensioner adapted for attachment to broken ends of a chain in a conveyor such as of panzer or scraper chain type, with hydraulic means for attachment to a pressure line, and the hydraulic means comprising a tensioning jack, hydraulic intensifier means, and valve control means for operating the jack and intensifier means. Conveniently the tensioning jack and intensifier piston and cylinder are mounted, together with control valve means, as a unit adapted to be placed on the conveyor, and opposite ends of the hydraulic jack, which extends lengthwise of the conveyor, are connected by releasable connecting means to spaced flight bars interconnecting chains at opposite sides of the conveyor. Conveniently also there are two control valves one for applying controlling pressure to the hydraulic jack, and the other for controlling the intensifier. Alternatively there may be only one control valve constructed and arranged to control the jack and the intensifiers. The control valve means and intensifier may be removable to a distance from the jack and re-connectable hydraulically thereto for controlling the jack from a remote location. The control valve means may be constructed and arranged for continued operation of the intensifier if necessary until a required intensifier pressure has been reached in the jack. There may be included an overload relief valve and a release valve, which may be pilot operated, for releasing pressure from the jack.

Figure 2:
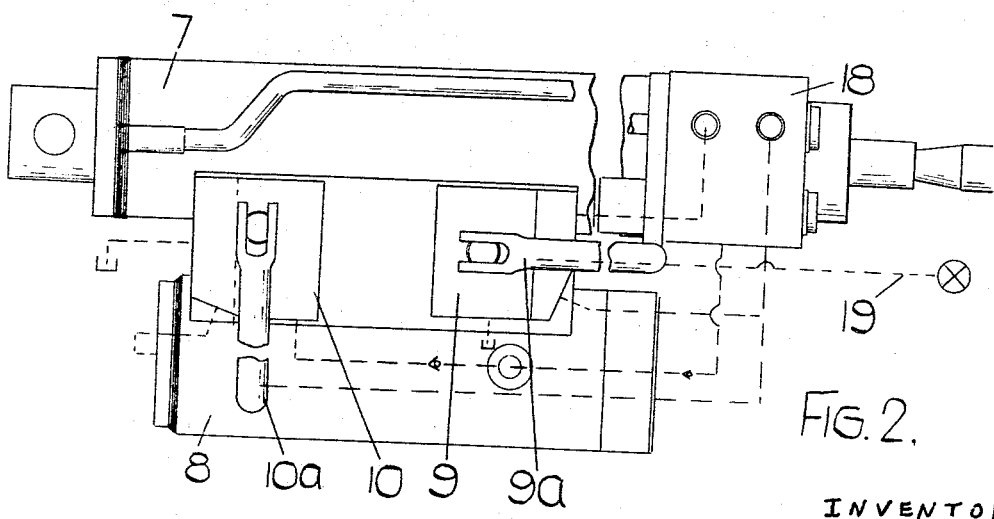
Figure 9:
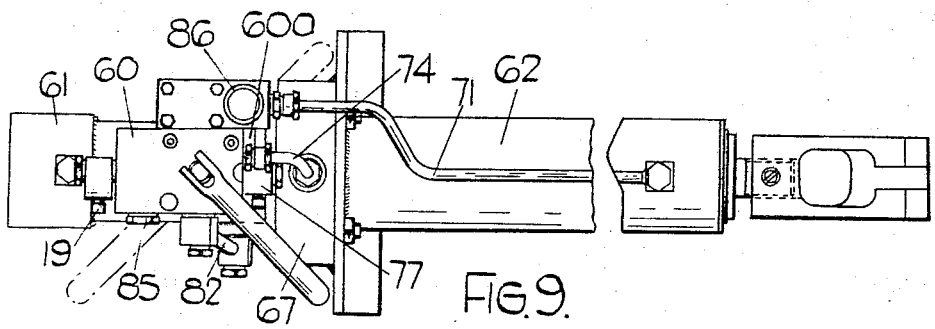
Figure 10:
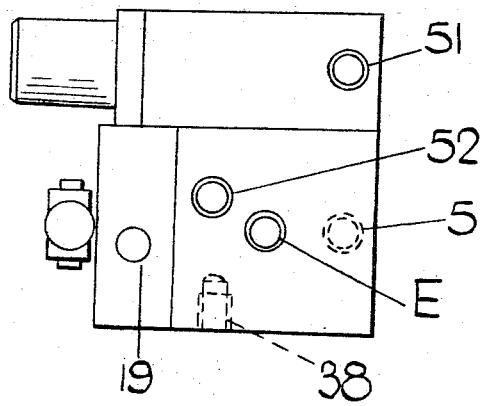
Figure 11:
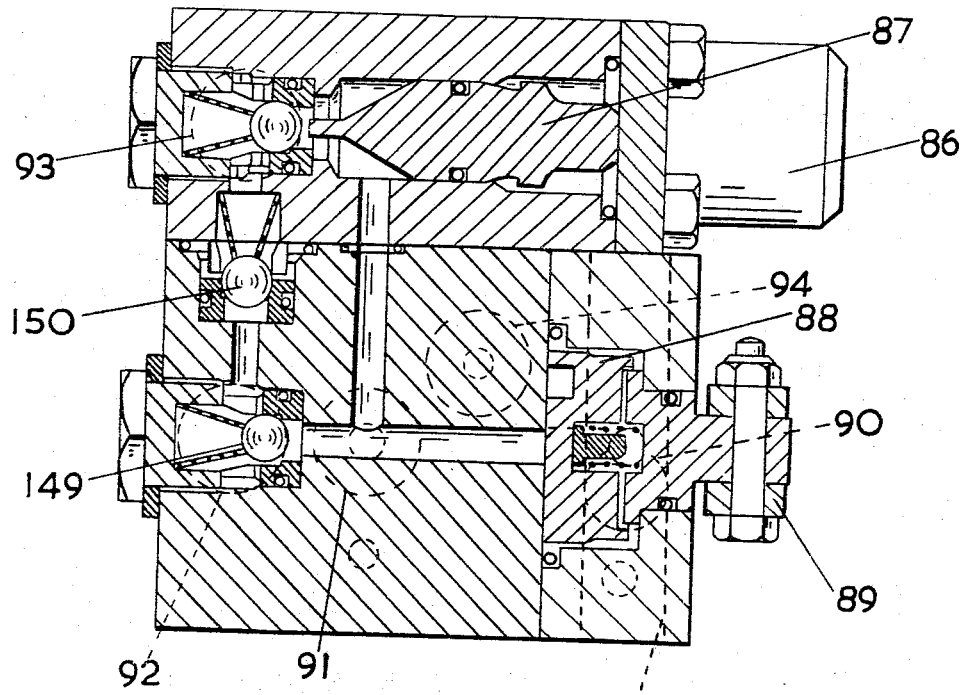
Figure 12:
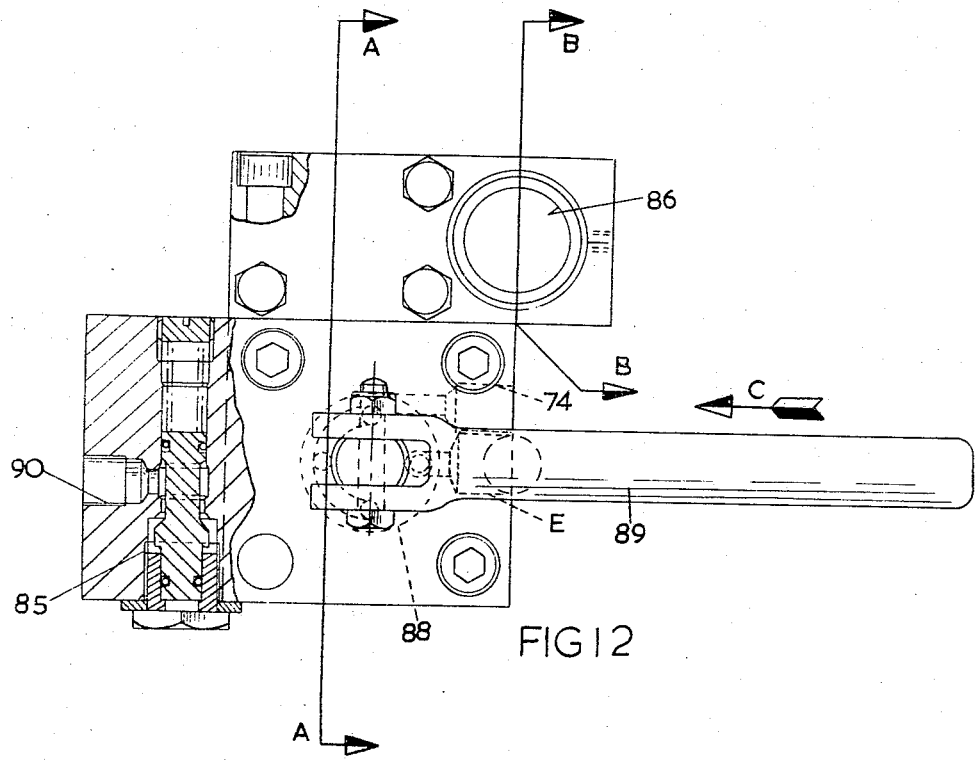
Figure 13:
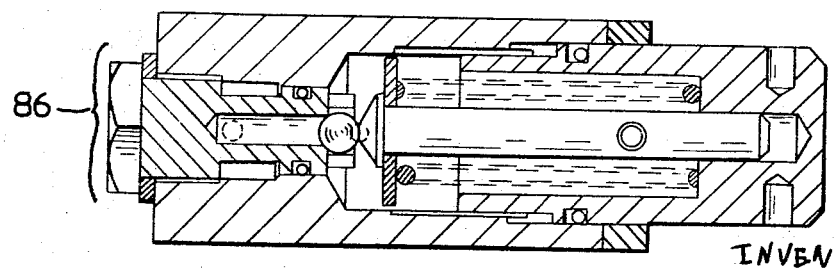

The above and other features of the invention set out in the appended claims are incorporated in the construction which will be hereinafter particularly described by way of example with reference to the accompanying drawings, in which:

FIGURE 1 is a general perspective view of a scraper chain conveyor for use along a coal face in long wall mining,
FIGURE 2 is an enlarged plan view of a chain tensioning unit for use with the conveyor,
FIGURE 3 is an end view of FIGURE 2,
FIGURE 4 is a hydraulic circuit diagram for the unit,
FIGURE 5 is a diagrammatic showing of a modified hydraulic circuit having only one valve,
FIGURE 6 is a side sectional view of the modified control valve,
FIGURE 7 is a front view of the modified valve,
FIGURE 8 is a side view of a modified control valve and intensifier unit,
FIGURE 9 is a plan view of part of FIGURE 8,
FIGURE 10 is an enlarged side view of a valve part of FIGURE 8,
FIGURE 11 is a side sectional view of the valve,
FIGURE 12 is a plan view of the valve,
FIGURE 13 is a detail of a relief valve part of FIGURE 8.

Referring to FIGURE 1 the conveyor comprises a metal trough 1 in which there runs opposite side panzer or scraper chains 2, 2a, which are employed in coal mines for long wall mining, and are interconnected by flight bars such as 3, 4, 5 and 6 at longitudinally spaced positions along the chains.

Following a chain breakage, due to overloading or other circumstances, there is provided for bringing the broken ends of the chain together so that it can be repaired, a portable chain tensioner.

This portable chain tensioner comprises, as a unit, a hydraulic jack 7, an intensifier cylinder and ram 8, and disc type fluid control means in the example comprising two control valves 9 and 10, all mounted, on the unit form on transverse bar supports 11, 12 suitable to be supported on the side walls 1a, 1b of the conveyor 1.

Conveniently a cover plate 13 is fitted over the hydraulic jack 7 and intensifier 8 which extend longitudinally of the conveyor 1.

To opposite ends of the hydraulic jack 7 there are connected short lengths of chain 14, 15 to the outer end of each of which there is secured a hook member 16, 17 for hooking onto the spaced flight bars 3 and 6.

From FIGURE 2 it will be seen that the control valves 9 and 10 have operating handles 9a, 10a (see also FIGURE 3 for handle 10a) and that these valves together with the hydraulic jack 7 and the intensifier 8 are connected in a hydraulic circuit with a relief valve 18, and an inlet to the circuit is derived from a releasable connection indicated by the dotted line 19 to a pressure line from a pump indicated at 20.

From the hydraulic circuit FIGURE 4 it will be seen that the inlet pressure line 19 is taken from the pump 20 to the valve 9, and from the valve 9 there is an outlet line 21 to the cylinder 7a of the hydraulic jack 7. Also from the valve 9 there is an outlet line 22 which is connected by line 22a to the valve 10 and by line 22b through a non-return valve 23 to the relief valve 18. The non-return valve 23 is pilot operated through a line 23a from the outlet line 21 of the valve 9.

From the valve 10 there is an outlet line 24 through non-return valves 25, 26 to the annulus 7b of the hydraulic jack 7, and the line 24 is also connected by a line 27 to the annulus 8a of the intensifier 8. An outlet line 28 from the valve 10 is taken to the intensifier cylinder 8b.

The annulus 7b of the hydraulic jack 7 is also connected by a return line 29 to the relief valve 18.

Each valve handle 9a, 10a has three positions A, N and B, the valve being constructed so that the intermediate position N is a neutral position providing for no flow of fluid through the valve.

The valve 9 is of well known disc type construction wherein the handle 10a is rotatably displaceable to rotatably displace a disc which is disposed in pressure inlet chamber and has a hole extending through it to be brought into and out of register with selected ducts in the valve body leading from the pipe connections to the valve, so that each of these ducts is opened to line pressure; the disc also has an arcuate recess in its rear face for releasably coupling selected of the ducts together. With the handle 9a in the A position, the inlet line 19 in connected by the discs hole to the outlet line 21 and the line 22 is connected by the discs recess to exhaust arc E, and with the handle 9a in the B position the inlet line 19 is connected by the discs hole to the output line 22, and the line 21 is connected by the discs recess to exhaust E.

The similarly constructed valve 10 is with the handle 10a in the A position, the inlet line 22a is connected by the discs hole to the outlet line 24 and the line 28 is connected by the discs recess to exhaust E, and with the handle 10a in the B position, the inlet line 22a is connected by the discs hole to the outlet line 28 and the line 24 is connected by the dicsc recess to exhaust E.

In use of the device, the hydraulic unit is first placed on the conveyor trough as shown in FIGURE 1, and the inlet line 19 is releasably connected to the nearest suitable part of the pressure line from the pump 20.

Next the valve handle 9a is moved to the A position whereby the fluid, which is under 900 to 1,000 lbs. p.s.i. is directed through the line 21 to the cylinder 7a of the hydraulic jack 7 This extends the jack 7 enabling the hooks 16, 17 to be hooked onto the flight bars 3, 6 respectively.

Then the valve handle 9a is moved to the B position so that the pressure fluid is directed through the lines 22, 22a to the valve 10, and through the line 22b including the non-return valve 23 to the relief valve 18 and through the line 29 to annulus 7b of hydraulic jack 7.

Following this the valve handle 10a is moved to its A position so that the pressure fluid is directed through the line 24 and the non-return valves 25, 26 to the annulus 7b of the hydraulic jack 7 so that the hydraulic jack 7 contracts. There may be as much as 10 tons load (to which the relief valve 18 is set) on the chain 2 so that although the hydraulic jack 7 will contract under the line pressure of 900 to 1,000 lbs. p.s.i., it will not contract sufficiently to bring the broken chain ends together into repairing relationship. The pressure fluid is also directed through line 27 to the annulus 8a of the intensifier 8 so that the intensifier 8 is contracted thereby to charge it at the annulus side thereof.

The valve handle 10a is then moved to the B position so that the pressure fluid is directed along the line 28 to the cylinder 8b of the intensifier 8 so that the intensifier 8 is extended thereby to intensify the fluid in the annulus 8a which discharges so that the intensified pressure is applied through the line 27 and the non-return valve 26 to the annulus 7b of the hydraulic jack 7 so that, assuming the increasing pressure ratio to be 3.77 to 1, the applied contracting pressure on the hydraulic jack 7 is then at least 3,400 lbs. p.s.i., whereupon the jack contracts further such as to the extent of 1½ inches.

The non-return valve 26 functions to retain the intensified pressure in the hydraulic jack 7, and the non-return valve 25 functions to isolate the intensified pressure set up in the annulus 8a from being applied to the valve 10 so as not to interfere with free operation of the valve 10.

At this stage the contraction of the hydraulic jack 7 may not be sufficient to bring the broken ends of the chain into the required repairing relationship. In the event that further contraction of the hydraulic jack is necessary, the operation of moving the valve handle 10 to the position A to re-charge the intensifier 8 and then to move the valve handle 10 to the position B for the intensifier 8 to re-discharge, is repeated until the hydraulic jack has been progressively contracted to the required state.

At this stage i.e. when the broken ends of the chain 2 have been brought together by the contracted jack 7 into repairing relationship, the valve handle 10 is moved to the neutral position N whereupon the repair can be effected.

After this, pressure is released from the hydraulic jack by moving the valve handle 9 to the position A by which pressure fluid is directed through the pilot line 23a to the non-return valve 23 which is thereby opened to connect the return line 29 from the hydraulic jack 7 to exhaust and simultaneously, the pressure fluid is directed through the line 21 to the cylinder 7a of the hydraulic jack 7 to re-extend the hydraulic jack 7 thereby allowing release of the hooks 16 and 17 from the flight bars 3, 6 and removal of the device from the conveyor.

It will be understood that the advantages of the device are that it is easily handled under mining conditions, it uses existing power facilities at the working face i.e. the existing hydraulic pressure line, it can be connected to the pressure line at any suitable position along the coal face, and it provides the high pressure required merely by control valve operation so that the amount of manual labor necessary is reduced to a minimum.

If desired there may be only one control valve as shown in FIGURES 5 to 7. Referring to FIGURE 5 the valve is indicated at 30 and it is of similar disc type to the valves 9 and 10. The valve disc is indicated separately at 31 with its hole 32 and arcuate recess 33. The pressure inlet line 19 is connected to the valve through the intermediary of a pressure limiting valve 34 comprising a housing 35 having a fluid passage 36 in which a valve member 37 can be slidably pre-set to pre-set the gap G between the valve head 37a and a shoulder 35a of the housing so that in this instance if the line pressure is 1,000–3,000 p.s.i., the outlet pressure from a transverse outlet 35b to the control valve 30 is 1,000 p.s.i. A return or exhaust line E is connected to a duct 37 in the valve 30, a pipe line 38 is connected between the piston head end 8b of the intensifier cylinder 8 and a duct 39 in the valve 30, a pipe line 40 is connected between the annulus side of a release valve 41 and a duct 42 in valve 30, and a pipe line 43 is connected between the piston head end of the release valve 41 and a duct 44 in valve 30. A pipe line 45 from the annulus side 8a of the intensifier 8 is connected to one end of a known spring loaded relief valve 46, the annulus part of which is connected by pipe line 47 to exhaust E, and the line 45 is also connected by a line 48 and non-return valve 49 to the line 40 and through a non-return valve 50 to the ball end of the release valve. Line 45 is also connected by line 51 to the annulus end 76 of the jack 7. From the piston head end 7a of the jack 7 there is a line connection 52 to the line 43.

The valve disc operating handle, as for valves 9 and 10, is displaceable to positions indicated at A, B and C to place the valve disc 31 with its hole 32 at positions P1, P2 and P3. Intermediate neutral positions of the handle are indicated at N. With the handle at A position as shown, fluid is supplied through the pressure limiting valve 34, through the disc hole 32 at position P1 to the duct 44 and through lines 43 and 52 to the piston head end 7a of the jack to extend the jack, and the fluid is also supplied from the line 43 to the piston head end of the release valve whereby the valve member 41a is moved to unseat its ball 41b allowing fluid from the jack's annulus 76 to flow via line 51, valve 50, line 48, valve 49, line 40, duct 42 and the disc's recess 33 to duct 37 connected to exhaust E. With the handle at position B, fluid is supplied through the disc hole as before but at position P2 where the fluid passes via duct 42, line 40, valve 49, line 48, and line 45 to the intensifier annulus 8a and also from line 45 via valve 50 and line 51 to the jack annulus 7b so as to retract the intensifier and jack rams, while the piston head ends 8b, 7a of the intensifier and jack are connected by lines 38 and 52, 43 to ducts 39 and 44 which are coupled to the exhaust duct 37 by the disc's recess 33.

With the handle at the position C, fluid is supplied through the disc hole as before but at position P3 where the fluid passes via duct 39 and line 38 to the piston head end 8b of the intensifier 8 so that the piston is moved to apply intensified pressure in line 45 and consequently through valve 50 and line 51 to intensify the pressure in the annulus side 76 of the jack 7, for the purpose hereinbefore described, the pressure being maintained by the non-return valve 50 and being prevented by non-return valve 48 from being applied to the control valve 30. During this time the piston head end 7a of the jack is open to exhaust via lines 52, 43, duct 44, the disc's recess 33 and duct 37. For repeat operation of the intensifier 8, if necessary, the intensifier piston is retracted by returning the valve handle to position B and then again moving it to position C, as many times as necessary.

FIGURES 6 and 7 of the control valve 30 show how the ducts are arranged in the valve block, the pressure limiting valve 34 being connected to an inlet duct 30a in the valve block and which leads to a chamber 30b accommodating the disc 31.

In the modification of FIGURES 8 to 12 the control valve 60 and intensifier 61 are removable to a distance away from the jack 62 and are re-connectable thereto hydraulically for remote control of the jack.

Referring to FIGURE 8, the jack 62, constructed and operable substantially as in the hereinbefore described examples, is secured by bolts 63, 64 and welding 66 to one side of the support bar 67. The intensifier 61, constructed and operable substantially as in the hereinbefore described examples, is removably attached by bolts 68, 69 to the other side of the support bar 67, and the control valve 60 is secured by welding 70 to the intensifier.

The aforesaid pipe line 51, part of line 45, and line 40 have their equivalent in a pipe 71 which is removably connected to the control valve 60 and jack 62 by screw nut means 72, 73, the non-return valves 49, 50 having their equivalent in valves 149, 150 disposed in a casing 60a. The aforesaid pipe line 52 has its equivalent in a pipe line 74 which is releasably connected to the control valve and jack by screw nut means 75, 76. The aforesaid exhaust or return line E has its equivalent in a pipe line 77 which is releasably connected to the control valve by screw nut means 78. The aforesaid line 38 has its equivalent in pipe 79 which if desired can be disconnected from the control valve and the intensifier by screw nut means 90, 81. The main part of aforesaid line 45 has its equivalent in line 82 which if desired can be disconnected from the control valve and the intensifier by the screw nut means 83, 84. The aforesaid pressure limiting valve has its equivalent in valve 85 FIGURES 11, 12. The aforesaid overload relief valve 46 has its equivalent in valve 86 see also FIGURE 13. The aforesaid release valve 41 has its equivalent in valve 87 FIGURE 11. The aforesaid disc 31 has its equivalent in disc 88, FIGURES 11, 12, and a suitable handle is indicated at 89. The aforesaid duct for the supply line 19 to be connected to has its equivalent in duct 90. The aforesaid ducts 37, 39, 42 and 44 in the control valve have their equivalent in ducts 91, 92, 93 and 94.

This device is operated substantially as for the device of FIGURE 5, but if required, the bracket screw nuts 60, 69, FIGURE 8, can be unscrewed, and the pipe screw nuts 72, 75 can be unscrewed so that the control valve and intensifier can be removed to a distance from the jack 62 where it is secured to another support. Then the broken pipe connections can be re-made by flexible piping so that the jack is then operable from a remote location.

What I claim is:

1. In a hydraulic system, the combination, comprising: hydraulic jack means, comprising, a jack cylinder, a piston slidable therein, and an elongated portion of a diameter smaller than the latter piston fixed to and extending from one side thereof through and beyond said jack cylinder to provide the latter on said one side of said latter piston with an annulus end and on the other side of the latter piston with a piston head end;

hydraulic intensifier means, comprising, an intensifier cylinder, a piston slidable therein and an elongated portion of a smaller diameter than said piston fixed to and extending from one side thereof through and beyond said intensifier cylinder to define an annulus end of said cylinder on said one side of said piston, said intensifier cylinder having a piston head end on the side of said piston opposite from said annulus end, and said connecting conduit means communicating with said annulus end of said intensifier cylinder;

connecting conduit means extending between an interconnecting said intensifier means with said jack means, said connecting conduit means communicating with said annulus end of said jack cylinder, said intensifier means having charging and discharging strokes and delivering fluid under pressure to said hydraulic jack means during said discharging strokes while receiving additional fluid during said charging strokes;

non-return valve means in said connecting conduit means preventing fluid from flowing from said jack means back to said intensifier means;

supply conduit means communicating with said intensifier means for supplying fluid thereto, said supply conduit means having a discharge portion communicating with said piston head end of said cylinder and a charging portion communicating with said annulus end of said cylinder;

valve means operatively connected with said supply conduit means for supplying through the latter fluid to said intensifier means for repeatedly actuating the latter to carry out said charging and discharging strokes thereof, until a given pressure has built up in said jack means, said valve means having a charging position directing fluid through said charging portion of said supply conduit means into said annulus end of said cylinder and a discharging position directing fluid through said discharging portion of said supply conduit means into said piston head end of said cylinder;

a second non-return valve means carried by said charging portion of said supply conduit means for admitting fluid through the latter into said annulus end of said intensifier cylinder while preventing fluid from flowing back through said charging portion of said supply conduit means to said valve means;

and a pair of connecting means disposed at the exterior of said hydraulic jack means and respectively connected with said piston head end of said jack cylinder thereof and with said elongated portion extending from said piston thereof for connecting said hydraulic jack means between a pair of elements which are to be pulled toward each other.

2. The combination of claim 1 and wherein a portable support means carries all of the remaining components so as to render the system portable.

3. The combination of claim 1 and wherein an additional conduit means communicates with said piston head end of said jack cylinder for supplying fluid thereto for extending said hydraulic jack means preparatory to applying said pair of connecting means to a pair of elements which are to be pulled toward each other, and said valve means being operatively connected also with said additional conduit means for directing fluid thereto in a third position of said valve means.

4. The combination of claim 3 and wherein said valve means includes a single valve assembly having three positions in one of which fluid is supplied through said additional conduit means to extend said jack means, in a second of which fluid is directed to said charging conduit means for charging said intensifier means and for simultaneously retracting said hydraulic jack means during an initial phase of the operation thereof, and a third position for supplying fluid to said intensifier means through said discharge portion of said supply conduit means to discharge fluid from said annulus end of said intensifier cylinder to said annulus end of said jack cylinder.

5. The combination of claim 3 and wherein said valve means includes a pair of valve assemblies one of which provides said valve means with said third position thereof where fluid is applied through said additional conduit means to said hydraulic jack means for extending the latter, said one valve assembly having a second position for directing fluid to the other of said valve assemblies, and said other valve assembly having said charging and discharging positions for actuating said intensifier means.

References Cited
UNITED STATES PATENTS

| | | | |
|---|---|---|---|
| 1,029,510 | 6/1912 | Prestbye | 254—93 |
| 1,332,340 | 3/1920 | Horne | 60—51 |
| 1,576,204 | 3/1926 | Maxey | 254—93 X |
| 2,351,872 | 6/1944 | Parker. | |
| 2,573,993 | 11/1951 | Sedgwick | 60—51 |
| 2,706,891 | 4/1955 | Greer | 60—54.5 |
| 2,947,275 | 8/1960 | Edmonds | 254—51 X |
| 3,150,859 | 9/1964 | Payne | 254—51 |

WILLIAM FELDMAN, *Primary Examiner.*

MILTON S. MEHR, *Examiner.*